United States Patent
Park et al.

(10) Patent No.: US 7,529,452 B2
(45) Date of Patent: May 5, 2009

(54) METHOD FOR MANUFACTURING SINGLE MODE OPTICAL FIBER HAVING LOW POLARIZATION MODE DISPERSION

(75) Inventors: Ji-Sang Park, Seoul (KR); Soon-Il Sohn, Gwangmyeong-si (KR); Lae-Hyuk Park, Seoul (KR)

(73) Assignee: LS Cable Ltd. (KR)

( * ) Notice: Subject to any disclaimer, the term of this patent is extended or adjusted under 35 U.S.C. 154(b) by 99 days.

(21) Appl. No.: 11/838,454

(22) Filed: Aug. 14, 2007

(65) Prior Publication Data

US 2008/0041110 A1 Feb. 21, 2008

(30) Foreign Application Priority Data

Aug. 17, 2006 (KR) ............... 10-2006-0077649

(51) Int. Cl.
*G02B 6/02* (2006.01)
(52) U.S. Cl. ............ 385/123; 385/124; 385/125; 385/126; 385/127; 65/376; 65/385; 65/403
(58) Field of Classification Search ........... 385/123, 385/124, 125, 126, 127; 65/376, 385, 403
See application file for complete search history.

(56) References Cited

U.S. PATENT DOCUMENTS 5,298,047 A * 3/1994 Hart et al. ............ 65/432

6,550,281 B1 * 4/2003 Hawk ............ 65/402

* cited by examiner

*Primary Examiner*—Jennifer Doan
(74) *Attorney, Agent, or Firm*—Stroock & Stroock & Lavan LLP (57) ABSTRACT

A method for manufacturing a single mode optical fiber with a reduced PMD (Polarization Mode Dispersion), by drawing an optical fiber preform composed of a core and a clad surrounding the core, includes (a) heating the optical fiber preform to a high temperature using a furnace, and drawing an optical fiber from an outlet of the furnace at a linear velocity ($V_f$) of 500 mpm or above by means of neck-down drawing; and (b) impressing a spin on the optical fiber by means of a spin impressing device provided on a drawing path of the optical fiber, wherein a maximum spatial frequency of spin (y) impressed on the optical fiber satisfies the following equations $$\mathrm{Exp}(24t - 12) \le y \le -20 \times \log\left(\frac{V_f}{500}\right) + 25$$

and
$t = (0.21 \times \mathrm{CladOval}) + (0.04 \times \mathrm{CoreOval}) + (0.17 \times \mathrm{ECC})$, where y is a maximum spatial frequency of spin [turns/m], $V_f$ is a drawing velocity [mpm], CladOval is a clad ovality [%], CoreOval is a core ovality [%], and ECC is an eccentricity [μm].

4 Claims, 7 Drawing Sheets

METHOD FOR MANUFACTURING SINGLE MODE OPTICAL FIBER HAVING LOW POLARIZATION MODE DISPERSION

CROSS-REFERENCE TO RELATED APPLICATION

This application claims priority to Korean Patent Application no. 10-2006-0077649 filed on Aug. 17, 2006 the entirety of which is incorporated herein by reference.

BACKGROUND OF THE INVENTION

1. Field of the Invention

The present invention relates to a method for manufacturing a single mode optical fiber having a low PMD (Polarization Mode Dispersion), and more particularly to a method for lowering PMD of an optical fiber.

2. Description of the Related Art

Theoretically, a single mode optical fiber with a circular symmetric structure has two orthogonal polarization modes. Generally, an electric field of light propagating through an optical fiber may be considered as an overlap of such two specific polarization modes. In fact, in a real single mode optical fiber, two polarization modes are offset due to incomplete factors such as asymmetric lateral stress or asymmetry of optical fiber geometry. These two modes are propagated with different phase velocities, and thus two polarization modes are propagated with different propagation constants ($\beta_1$ and $\beta_2$). This difference of propagation constants is called a birefringence ($\Delta\beta$), and the increase of birefringence means an increase of the difference of velocities of two polarization modes.

Here, a differential time delay between two polarization modes is called a polarization mode dispersion (PMD), which spreads pulses of light transmitted through an optical fiber, thereby increasing a bit-error rate. Thus, in data transmission through an optical fiber, PMD acts as an essential factor for limiting a capacity of data, so it is not preferable in a signal transmission system, particularly in an optical fiber operating over a long distance.

In order to ensure transmitting/receiving performance of an optical fiber, it is essential to attenuate PMD and thus minimize dispersion of signals. A most preferred scheme to lower PMD is to make an optical fiber with a uniform circular section without mechanical stress or ovality. But, it is substantially difficult to completely remove mechanical stress and ovality of an optical fiber.

For reducing PMD of an optical fiber, it is required to cause a torsional deformation on an optical fiber drawn from an outlet of a furnace. That is to say, a spin is impressed on the optical fiber such that the optical fiber is twisted. As a result, when an optical pulse is transmitted to the optical fiber, the optical pulse is propagated through a slow birefringence axis and a fast birefringence axis, alternately, thereby compensating a relative delay and reducing pulse spreading. It is equivalent to that a local effective refractive index for the pulse becomes equal to an average refractive index of both axes, and this average is applied over the entire pulse length of the optical fiber.

PMD of an optical fiber may be reduced by a spin impressed during the drawing process, and there is proposed a method for optimizing spin conditions in the drawing process. Namely, U.S. Pat. No. 5,298,047 and US 2005/0172675 disclose a method for generating a torsion on an optical fiber to have a spatial frequency (spins/m) with irregular spins impressed on the optical fiber, by canting a guide roller contacted with a coated optical fiber at a certain angle with respect to a drawing axis or linearly reciprocating the guide roller in a direction perpendicular to the drawing axis.

Figure 2:
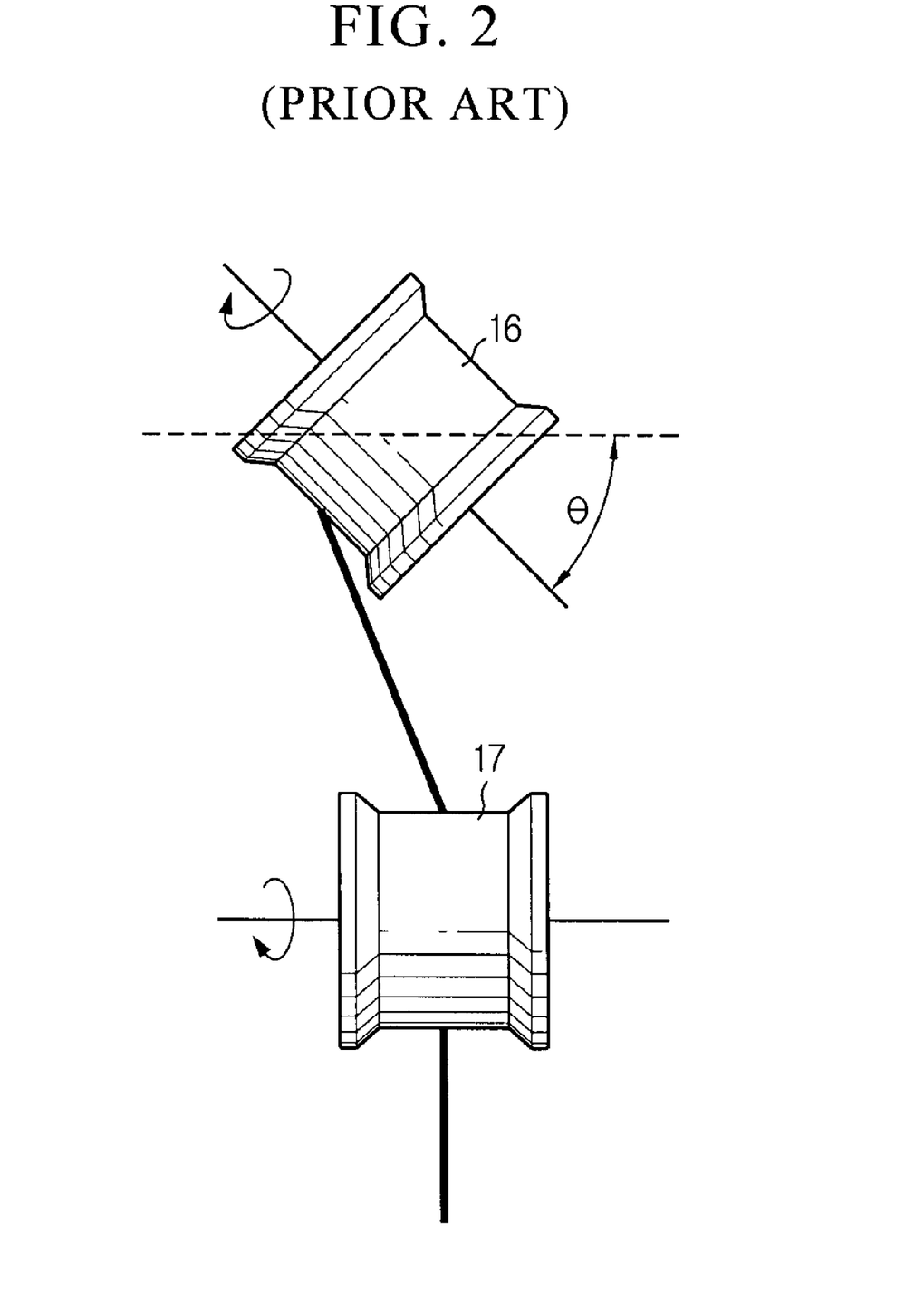
FIGS. 2 and 3 are perspective views showing a conventional spin impressing device.
Figure 3:
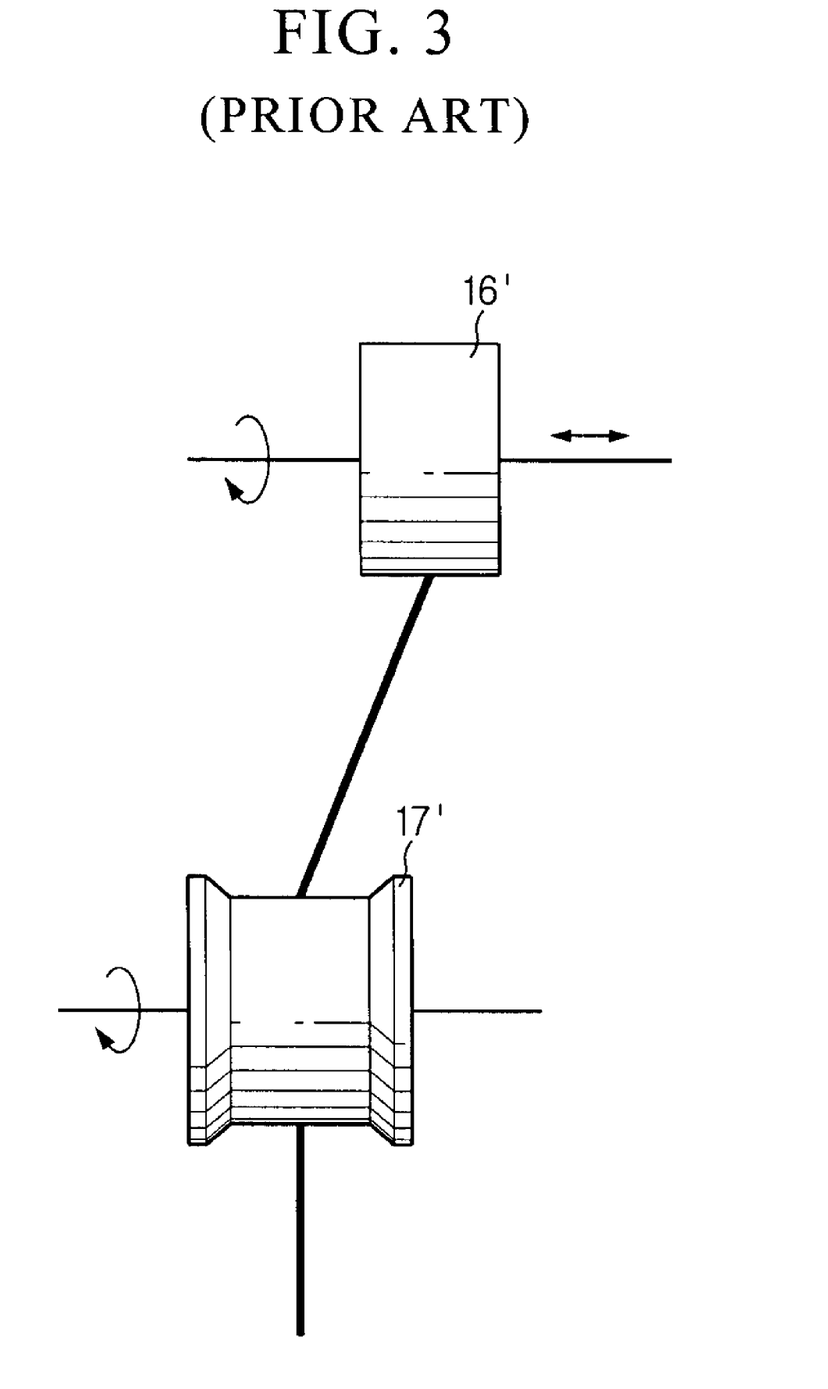

The above conventional method will be explained in more detail with reference to FIGS. 1 to 3.

Figure 1:
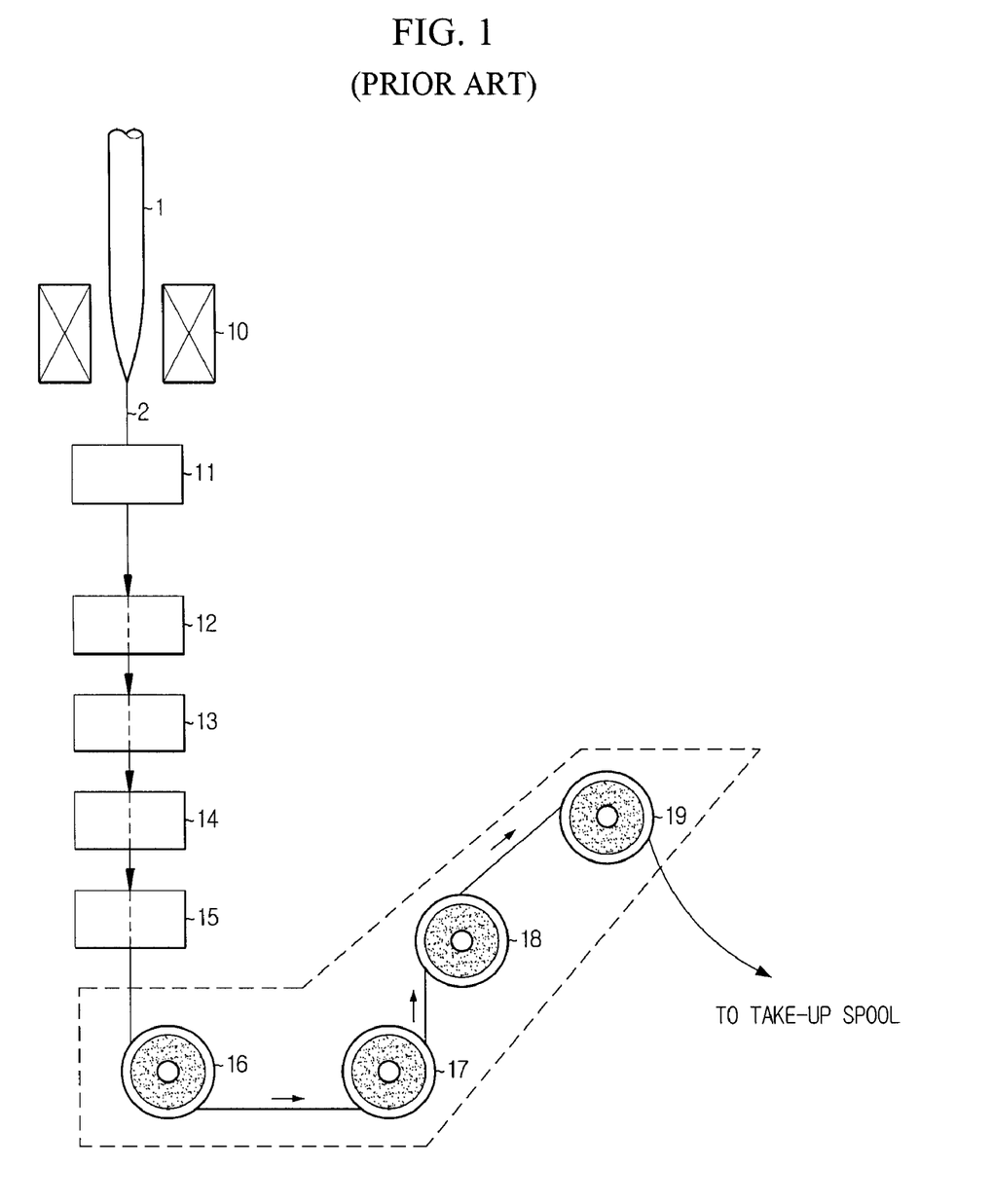
FIG. 1 is a schematic view showing a conventional optical fiber drawing device.

First, as shown in FIG. 1, an optical fiber preform 1 is melted at a sufficiently high temperature in a furnace 10, and the optical fiber preform 1 is drawn into a single-strand optical fiber 2 from its neck-down portion. Then, the optical fiber passes through a diameter monitor 11, a coating device 12, a curing device 14 and a coating diameter monitor 15. After that, as the melted optical fiber passes over a guide roller 16, a spin is impressed on the optical fiber near the neck-down region by the guide roller, and then the spin-impressed optical fiber is directed to a capstan. At this time, the guide roller 16 cants with being inclined at a certain angle with respect to the drawing axis as shown in FIG. 2, or the guide roller 16' linearly reciprocates in a direction perpendicular to the drawing axis as shown in FIG. 3, thereby impressing a spin on the optical fiber. At this time, the spin function is a substantial sine function or an amplitude-modulation or frequency-modulation sine function.

In the above spin impressing method for reducing PMD, U.S. Pat. No. 5,298,047 discloses that a maximum spatial frequency of spin impressed on an optical fiber is in excess of 4 spins/m, preferably in excess of 10 turns/m or even 20 spins/m.

However, if the maximum spatial frequency of spin exceeds 4 turns/m, PMD may be reduced, but mechanical stresses caused by shaking of the optical fiber may result in fluctuation of a fiber outer diameter or generation of bubbles during a coating process in the coating device. In addition, even in the case that a maximum spatial frequency of spin is less than 4 turns/m, the optical fiber can have a low PMD due to its symmetric geometry.

Meanwhile, US 2005/0172675 discloses that a maximum spatial frequency of spin impressed on an optical fiber satisfies the following equation. At this time, in the following equation, x is a clad ovality in unit of %, and y is a maximum spatial frequency of spin in unit of turn/m.

$$\mathrm{Exp}(24x-12) \leq y \leq 4$$

However, in the above equation, a minimum value of the maximum spatial frequency of spin for lowering PMD is obtained by considering just a factor about the clad ovality. That is to say, other variables deciding the degree of optical asymmetry of an optical fiber preform, such as a core ovality and eccentricity (ECC), are not considered.

Furthermore, an eccentricity, which is a center deviation caused in the drawing process between the clad and the core, and a core ovality, which is substantially over 5 to 6 times a clad ovality, are not considered at all in the prior art, though they are important factors to determine spin conditions, so it is not easy to obtain a desired PMD reduction effect.

SUMMARY OF THE INVENTION

The present invention is designed in consideration of the problems of the prior art, and therefore it is an object of the present invention to provide a method for manufacturing a single mode optical fiber having a low PMD (Polarization Mode Dispersion), which improves PMD characteristics of the optical fiber, by optimizing a maximum spatial frequency of spin impressed during an optical fiber drawing process.

In order to accomplish the above object, the present invention provides a method for manufacturing a single mode optical fiber with a reduced PMD (Polarization Mode Dispersion), by drawing an optical fiber preform composed of a core and a clad surrounding the core, the method comprising: (a) heating the optical fiber preform to a high temperature using a furnace, and drawing an optical fiber from an outlet of the furnace at a linear velocity ($V_f$) of 500 mpm or above by means of neck-down drawing; and (b) impressing a spin on the optical fiber by means of a spin impressing device provided on a drawing path of the optical fiber, wherein a maximum spatial frequency of spin (y) impressed on the optical fiber satisfies the following equation 1:

$$\text{Exp}(24t - 12) \leq y \leq -20 \times \log\left(\frac{V_f}{500}\right) + 25 \quad \text{Equation 1}$$
$$t = (0.21 \times CladOval) + (0.04 \times CoreOval) + (0.17 \times ECC)$$

where y is a maximum spatial frequency of spin [turns/m], $V_f$ is a drawing velocity [mpm], CladOval is a clad ovality [%], CoreOval is a core ovality [%], and ECC is an eccentricity [μm].

Preferably, the spin impressing device makes spin movements in clockwise and counterclockwise directions alternately with canting at a predetermined angle with respect to a drawing axis.

More preferably, the maximum spatial frequency of spin (y) allows the optical fiber to have a PMD of 0.5 ps/km$^{1/2}$ or less.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 4:
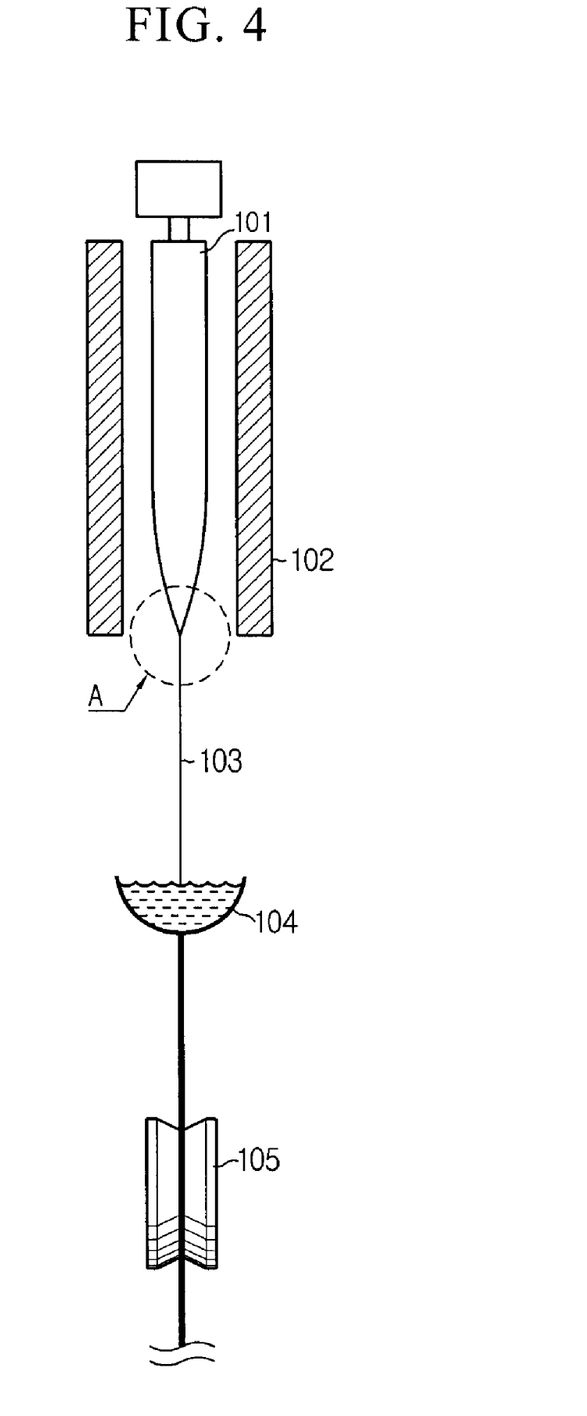
FIG. 4 is a schematic view showing an optical fiber drawing device according to a preferred embodiment of the present invention.

A method for manufacturing a single mode optical fiber having a low PMD (Polarization Mode Dispersion) according to the present invention is realized by impressing a spin on an optical fiber using a spin impressing device provided on an optical fiber drawing path, as shown in FIG. 4.

As shown in FIG. 4, an optical fiber manufacturing apparatus includes a furnace 102 for melting an optical fiber preform 101 to draw a bare optical fiber 103, a coating device 104 for coating the bare optical fiber 103 drawn from an outlet of the furnace 102, and a spin impressing device 105 for impressing a spin on the optical fiber coated by the coating device 104.

The furnace 102, the coating device 104 and the spin impressing device 105 are mounted on a drawing tower in order. Though not shown in FIG. 4, a diameter control device for controlling a diameter of the bare optical fiber 103 and a cooling device for cooling the bare optical fiber 103 may be subsequently mounted between the furnace 102 and the coating device 104, and a UV (Ultraviolet) curing device for curing the coating may be mounted between the coating device 104 and the spin impressing device 105. In addition, a capstan for drawing the optical fiber at a constant drawing velocity and a take-up bobbin for taking up the optical fiber are subsequently arranged below the spin impressing device 105.

In this embodiment, the optical fiber preform 101 is heated to a high temperature in the furnace 102, where the bare optical fiber 103 is drawn from a neck-down portion A of the softened optical fiber preform 101. The bare optical fiber 103 is coated by the coating device 104, and the coated optical fiber is processed into a spin-impressed optical fiber with passing through the spin impressing device 105. Here, the spin impressing device 105 is provided on the optical fiber drawing path to rotate in a clockwise or counterclockwise direction, and at the same time it cants at a certain angle with respect to a drawing axis or linearly moves in a direction perpendicular to the drawing axis, thereby impressing a spin on the optical fiber.

At this time, if a linear velocity of the bare optical fiber 103 drawn from the neck-down portion A is less than 500 mpm (meters per minute), productivity of the optical fiber may be deteriorated. Thus, the linear velocity applied to the optical fiber by the spin impressing device 105 is kept at 500 mpm or above in consideration of productivity of a large-diameter optical fiber.

In this embodiment, the following table 1 shows experimental data representing PMD reduction and manufacture error of the optical fiber in case a predetermined maximum spatial frequency of spin is impressed on an optical fiber drawn at a linear velocity of 1400 mpm or 1800 mpm. At this time, the mark "O" in the table 1 indicates that PMD is 0.5 ps/km$^{1/2}$ or less at a wavelength of 1310 μm, and there is no shaking or coating bubble of the optical fiber. Here, the above wavelength is just selected as an example, and it should be understood that the present invention is not limited thereto.

TABLE 1

|  | y (turn/m) | $V_f$ (mpm) | PMD reduced state | Manufacture status |
|---|---|---|---|---|
| Embodiment 1 | 1.5 | 1400 | X | ○ |
| Embodiment 2 | 9.0 | 1400 | ○ | ○ |
| Embodiment 3 | 20.0 | 1400 | ○ | X |
| Embodiment 4 | 1.5 | 1800 | ○ | ○ |
| Embodiment 5 | 13.0 | 1800 | ○ | ○ |
| Embodiment 6 | 15.0 | 1800 | ○ | X |

As seen from the above table 1, in the embodiments 1 and 2 under the condition that a linear velocity of an optical fiber is 1400 mpm and a maximum spatial frequency of spin is 9 turns/m or less, there is no error in the manufacture status. However, it would be noted that, in the embodiment 3 under the condition that the linear velocity is 1400 mpm and the maximum spatial frequency of spin is 20 turns/m, there is an error in the manufacture status.

In addition, in the embodiments 4 and 5 under the condition that a linear velocity of an optical fiber is 1800 mpm and a maximum spatial frequency of spin is 13 turns/m or less, there is no error in the manufacture status. However, it would be understood that, in the embodiment 6 under the condition that the linear velocity is 1800 mpm and the maximum spatial frequency is 15 turns/m, there is an error in the manufacture status.

As understood from the table 1, though a linear velocity applied to an optical fiber through the spin impressing device 105 is constantly kept over 500 mpm, there may occur an error in the process if the maximum spatial frequency of spin exceeds a predetermined value. That is to say, if the maximum spatial frequency of spin according to the linear velocity of the optical fiber is great, a spin amplitude applied to the optical fiber by the spin impressing device 105 is increased, and the increased spin amplitude causes shaking of the optical fiber on the drawing path to generate an outer diameter deviation, and also causes bubbles in the coating process to deteriorate quality of the optical fiber.

Accordingly, the spin impressing device 105 impresses a maximum value of the maximum spatial frequency of spin (y), which satisfies the following equation 1, on an optical fiber, thereby preventing any error in the drawing process, such as an outer diameter deviation or generation of coating bubbles. Here, "$V_f$" indicates a linear velocity, namely a drawing velocity, in unit of mpm.

$$y \leq -20 \times \log\left(\frac{V_f}{500}\right) + 25 \quad \text{Equation 1}$$

As noted from the equation 1 and the table 1, in case a linear velocity ($V_f$) of an optical fiber is 1400 mpm, a maximum value of the maximum spatial frequency of spin (y) according to the equation 1 should be 16 turns/m or less. However, it would be understood that the embodiments 1 and 2 whose maximum spatial frequency of spin equal to or smaller than 9 turns/m satisfies the above condition show no error in their manufacture status, but the embodiment 3 whose maximum spatial frequency of spin is 20 turns/m in excess of the above condition shows an error in its manufacture status.

In addition, in case a linear velocity ($V_f$) of an optical fiber is 1800 mpm, a maximum value of the maximum spatial frequency of spin (y) according to the equation 1 should be 13.9 turns/m or less. However, it would be understood that the embodiments 4 and 5 whose maximum spatial frequency of spin equal to or smaller than 13 turns/m satisfies the above condition show no error in their manufacture status, but the embodiment 6 whose maximum spatial frequency of spin is 15 turns/m in excess of the above condition shows an error in its manufacture status.

In the above equation 1, the maximum value of the maximum spatial frequency of spin (y) has a logarithmic function value, in which the maximum value of the maximum spatial frequency of spin (y) approaches "∞" as the linear velocity ($V_f$) approaches "0", and the maximum value of the maximum spatial frequency of spin (y) approaches "0" as the linear velocity ($V_f$) approaches "∞".

Figure 5:
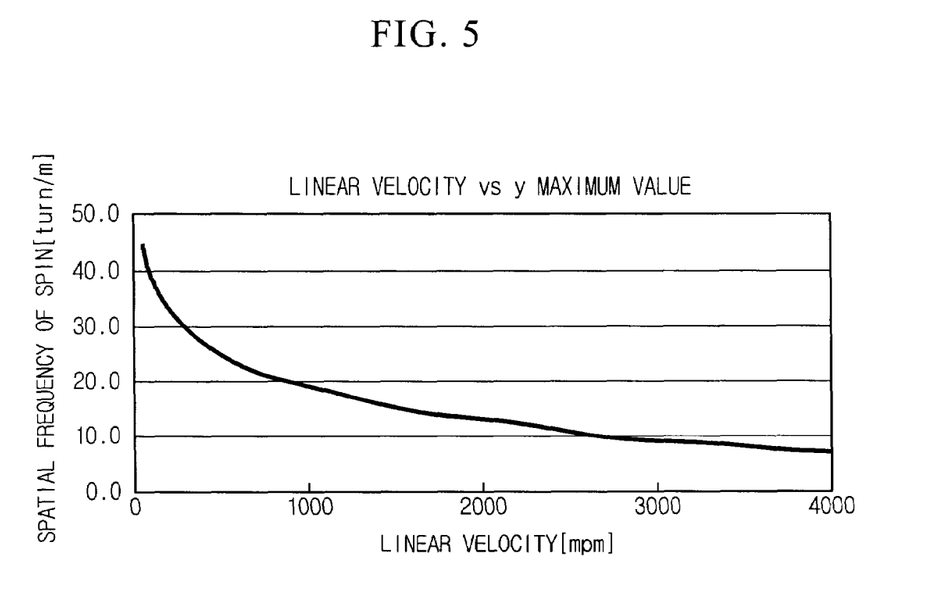
FIG. 5 is a graph showing a correlation between a maximum value of a maximum spatial frequency of spin (y) and a drawing velocity ($V_f$) according to the preferred embodiment of the present invention.

As being checked from the equation 1 and FIG. 5, in case the linear velocity ($V_f$) is increased over 500 mpm, the maximum spatial frequency of spin (y) has a logarithmic curve value reduced below 25 turns/m, and an optical fiber to which a spin satisfying the maximum spatial frequency of spin (y) not greater than 25 turns/m may get a reduced PMD without any error in the drawing process. Meanwhile, in case the linear velocity ($V_f$) is reduced below 500 mpm, the maximum spatial frequency of spin (y) has a logarithmic curve value exceeding 25 turns/m, and an optical fiber to which a spin satisfying the maximum spatial frequency of spin (y) exceeding 25 turns/m still shows shaking or coating bubbles in the drawing process.

Meanwhile, though a maximum value of a maximum spatial frequency of spin (y) that satisfies the equation 1 is impressed on an optical fiber such that the optical fiber has a good manufacture status, the PMD of the embodiment 1 does not satisfy the condition as seen from the table 1, namely the PMD is not less than 0.5 ps/km$^{1/2}$ at a wavelength of 1310 μm, so a desired PMD reduction effect of the optical fiber is not expected. In order to reduce the PMD, factors other than the linear velocity, namely optical asymmetry such as an ovality of core, an ovality of clad and eccentricity, should be considered.

In the embodiments of the present invention, the optical asymmetry of the embodiment 1 is shown in the following table 2. Here, "CladOval" and "CoreOval" are respectively ovality of clad and ovality of core in unit of %, and "ECC" is an eccentricity that is a deviation between centers of the core and clad, in unit of μm.

TABLE 2

|  | y (turns/m) | $V_f$ (mpm) | CoreOval (%) | CladOval (%) | ECC (μm) | PMD reduction state | Manufacture status |
|---|---|---|---|---|---|---|---|
| Embodiment 1 | 1.5 | 1400 | 5.0 | 1.0 | 0.7 | X | ○ |

As understood from the table 2, in the embodiment 1, an optical fiber is manufactured by impressing a maximum spatial frequency of spin that satisfies the equation 1 to have a good manufacture status, but its PMD reduction is bad. At this time, in the embodiment 1, the ovality of core is 5%, the ovality of clad is 1%, and the eccentricity is 0.7 μm. As the optical asymmetry is greater, the PMD of the optical fiber is increased, thereby not realizing a desired PMD reduction. Thus, a minimum value of the maximum spatial frequency of spin (y) that considers the optical asymmetry is applied to an optical fiber to give a desired PMD reduction.

Accordingly, the spin impressing device 105 impresses a minimum value of the maximum spatial frequency of spin (y) that satisfies the following equation 2 on an optical fiber so that a PMD not greater than 0.5 ps/km$^{1/2}$ at a wavelength of 1310 μm is obtained.

$$\text{Exp}(24t - 12) \leq y \qquad \text{Equation 2}$$
$$t = (0.21 \times CladOval) + (0.04 \times CoreOval) + (0.17 \times ECC)$$

As understood from the equation 2, a minimum value of the maximum spatial frequency of spin (y) is determined depending on the optical asymmetry of the optical fiber, which includes an ovality of core, an ovality of clad and an eccentricity, and the ovality and eccentricity will be explained below with reference to FIGS. 6 and 7.

Figure 6:
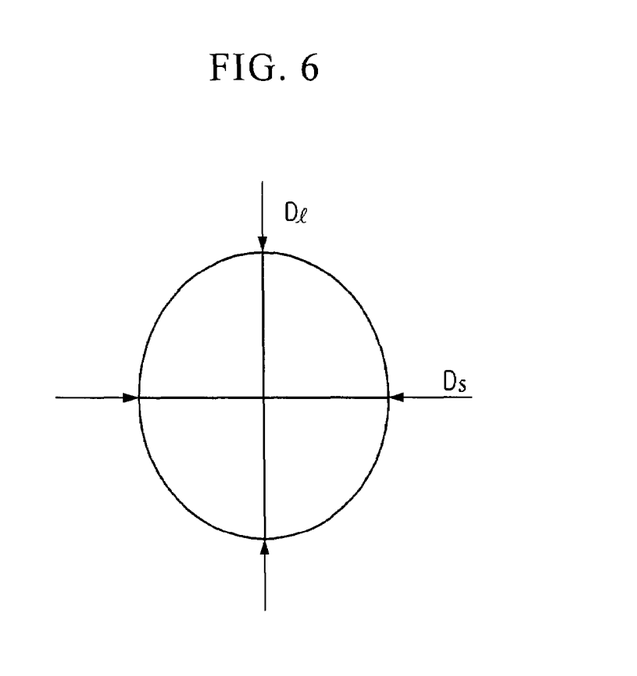
FIG. 6 is a schematic diagram for illustrating ovalities of a core and a clad according to the preferred embodiment of the present invention.
Figure 7:
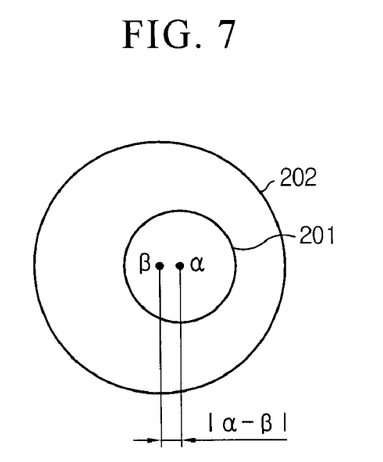
FIG. 7 is a schematic diagram for illustrating an eccentricity between the core and the clad according to the preferred embodiment of the present invention.

Referring to FIGS. 6 and 7, the ovality satisfies the following equation 3 with respect to a diameter (Dl) of a long axis and a diameter (Ds) of a short axis of the core and the clad, as shown in FIG. 6.

$$\text{Oval} = \frac{2(D_l \cdot D_s)}{D_l + D_s} \times 100 \qquad \text{Equation 3}$$

Meanwhile, the eccentricity is a deviation between the core center (α) and the clad center (β), as shown in FIG. 7.

Referring to FIG. 2 again, a minimum value of the maximum spatial frequency of spin (y) in the embodiment 1 should be not less than 2 turns/m according to the equation 2 so as to obtain a PMD not greater than 0.5 ps/km$^{1/2}$ at a wavelength of 1310 μm.

Figure 8:
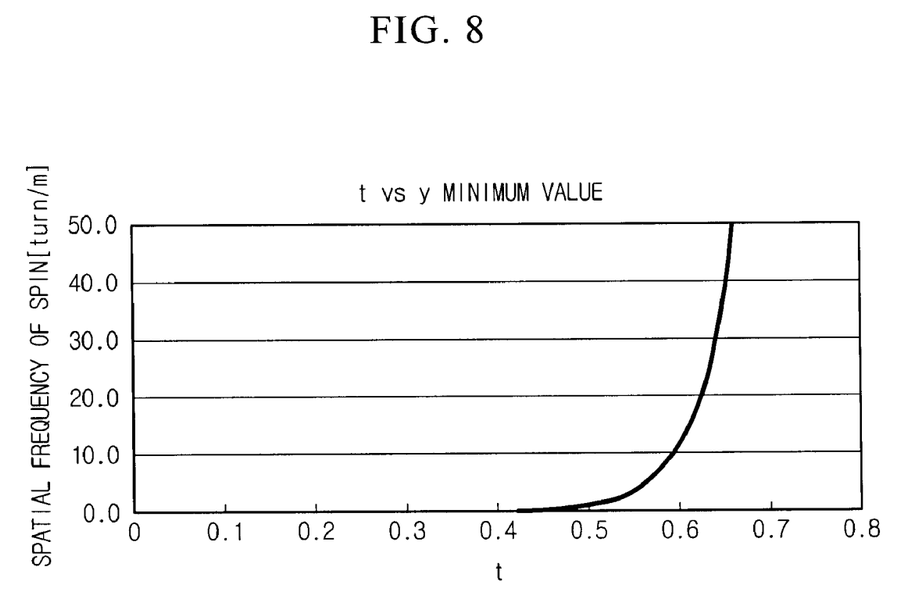
FIG. 8 is a graph showing a correlation between a minimum value of the maximum spatial frequency of spin (y) and a variable (t) of an equation according to the preferred embodiment of the present invention.

In the embodiments of the present invention, a minimum value of the maximum spatial frequency of spin (y) according to the equation 2 has an exponential function value, in which the minimum value approaches "0" as the variable "t" approaches "0", while the minimum value approaches "∞" as the variable "t" approaches "∞", as shown in FIG. 8.

As mentioned above, when the maximum spatial frequency of spin (y) satisfies the equations 1 and 2, it is possible to prevent any error and reduce PMD as desired in the drawing process. Thus, the maximum spatial frequency of spin (y) impressed on an optical fiber by the spin impressing device satisfies the following equation 4.

$$\text{Exp}(24t - 12) \leq y \leq -20 \times \log\left(\frac{V_f}{500}\right) + 25 \qquad \text{Equation 4}$$
$$t = (0.21 \times CladOval) + (0.04 \times CoreOval) + (0.17 \times ECC)$$

The optical fiber satisfying the spin condition of the maximum spatial frequency of spin (y) of the equation 4 reduces PMD lower than 0.5 ps/km$^{1/2}$ and prevents shaking or coating bubbles during the drawing process.

The following table 3 shows experiment data that indicate PMD reduction and manufacture error of the optical fiber, in case a predetermined maximum spatial frequency of spin (y) is impressed on an optical fiber with optical asymmetry.

TABLE 3

|  | y (turns/m) | $V_f$ (mpm) | CoreOval (%) | CladOval (%) | ECC (μm) | PMD reduction state | Manufacture status |
| --- | --- | --- | --- | --- | --- | --- | --- |
| Embodiment 1 | 5.0 | 2000 | 5.0 | 1.0 | 1.0 | X | ○ |
| Embodiment 2 | 9.0 | 2000 | 5.0 | 1.0 | 1.0 | ○ | ○ |
| Embodiment 3 | 13.0 | 2000 | 5.0 | 1.0 | 1.0 | ○ | X |
| Embodiment 4 | 2.5 | 2000 | 3.0 | 1.2 | 1.0 | X | ○ |
| Embodiment 5 | 6.0 | 2000 | 3.0 | 1.2 | 1.0 | ○ | ○ |
| Embodiment 6 | 13.0 | 2000 | 3.0 | 1.2 | 1.0 | ○ | X |

As understood from the table 3, in case an optical fiber with a linear velocity of 2000 mpm has a core ovality of 5.0%, a clad ovality of 1.0%, and an eccentricity of 1.0 μm, the maximum spatial frequency of spin (y) according to the equation 4 should satisfy the condition: 6.82≦y≦13.0 turns/m. However, it would be understood that, in the embodiment 2 satisfying the above conditions, the PMD was reduced to have 0.5 ps/km$^{1/2}$ or less at a wavelength of 1310 μm without any error in the manufacture status, but the embodiments 1 and 3 not satisfying the above conditions caused an error in the manufacture status or did not allow a desired PMD reduction.

In addition, in case an optical fiber has a core ovality of 3.0%, a clad ovality of 1.2%, and an eccentricity of 1.0 μm, a minimum value of the maximum spatial frequency of spin (y) according to the equation 2 should satisfy the condition: 2.74≦y≦13.0 turns/m. However, it would be understood that, in the embodiment 5 satisfying the above conditions, the PMD was reduced to have 0.5 ps/km$^{1/2}$ or less at a wavelength of 1310 μm, but the embodiments 4 and 6 not satisfying the above conditions caused an error in the manufacture status or did not allow a desired PMD reduction.

Figure 9:
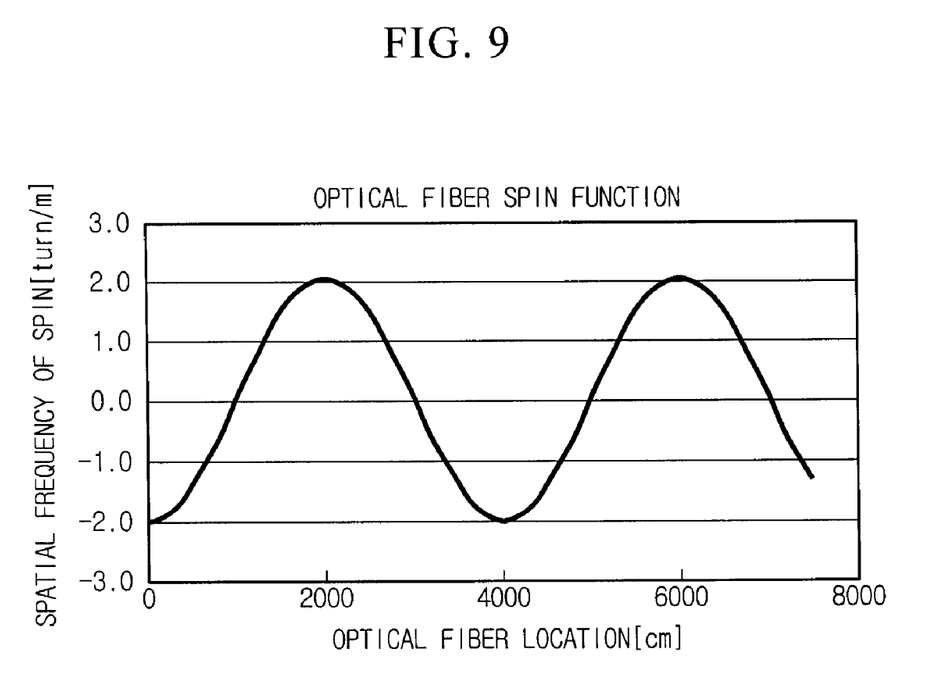
FIG. 9 is a graph showing a spin function of an optical fiber, to which the maximum spatial frequency of spin according to the preferred embodiment of the present invention is applied.

As another embodiment of the present invention, in case an optical fiber having a core ovality of 5.0%, a clad ovality of 0.9%, and an eccentricity of 0.7 μm is drawn at a linear velocity of 1400 mpm, the maximum spatial frequency of spin (y) according to the equation 4 satisfies the condition: 1.2 to 16 turns/m. Thus, if a maximum spatial frequency of spin (y) of 2 turns/m is impressed on the optical fiber as shown in FIG. 9, the optical fiber is manufactured into a single mode optical fiber with a reduced PMD without any error in the drawing process.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

As described above, the present invention provides an optimum condition of spin impressed on an optical fiber during a drawing process, thereby allowing to stably manufacture a single mode optical fiber with a reduced PMD without any error.

In addition, since a minimum value of the spin condition is defined in consideration of factors including a core ovality, a clad ovality and an eccentricity, an error rate of the minimum value for the spin condition may be decreased in comparison to the conventional one, thereby substantially capable of improving a reduction rate of PMD under the same conditions.

Moreover, since a maximum value of the spin condition is defined in consideration of a drawing velocity, it is possible to prevent any error in the drawing process, including an outer diameter deviation of the optical fiber and coating bubbles.

What is claimed is:

1. A method for manufacturing a single mode optical fiber with a reduced PMD (Polarization Mode Dispersion), by drawing an optical fiber preform composed of a core and a clad surrounding the core, the method comprising:
   (a) heating the optical fiber preform to a high temperature using a furnace, and drawing an optical fiber from an outlet of the furnace at a linear velocity ($V_f$) of 500 mpm or above by means of neck-down drawing; and
   (b) impressing a spin on the optical fiber by means of a spin impressing device provided on a drawing path of the optical fiber,
   wherein a maximum spatial frequency of spin (y) impressed on the optical fiber satisfies the following equation:

$$\mathrm{Exp}(24t - 12) \le y \le -20 \times \log\left(\frac{V_f}{500}\right) + 25$$

and $$t = (0.21 \times CladOval) + (0.04 \times CoreOval) + (0.17 \times ECC)$$

where y is a maximum spatial frequency of spin expressed in turns per meter, $V_f$ is a drawing velocity expressed in meters per minute, CladOval is a clad ovality expressed in a percentage, CoreOval is a core ovality expressed in a percentage, and ECC is an eccentricity expressed in µm.

2. The method for manufacturing a single mode optical fiber with a reduced PMD according to claim 1,
   wherein the spin impressing device makes spin movements in clockwise and counterclockwise directions alternately with canting at a predetermined angle with respect to a drawing axis.

3. The method for manufacturing a single mode optical fiber with a reduced PMD according to claim 1,
   wherein the maximum spatial frequency of spin (y) allows the optical fiber to have a PMD of 0.5 ps/km$^{1/2}$ or less.

4. The method for manufacturing a single mode optical fiber with a reduced PMD according to claim 2,
   wherein the maximum spatial frequency of spin (y) allows the optical fiber to have a PMD of 0.5 ps/km$^{1/2}$ or less.

* * * * *

UNITED STATES PATENT AND TRADEMARK OFFICE
CERTIFICATE OF CORRECTION

PATENT NO. : 7,529,452 B2  Page 1 of 1
APPLICATION NO. : 11/838454
DATED : May 5, 2009
INVENTOR(S) : Ji-Sang Park et al.

It is certified that error appears in the above-identified patent and that said Letters Patent is hereby corrected as shown below:

Column 4,
 line 64, after "wavelength of", change "1310 μm" to --1310 nm--.

Column 6,
 line 41, after "wavelength of", change "1310 μm" to --1310 nm--.

Column 7,
 line 11, change "1310 μm" to --1310 nm--.
 line 54, change "1310 μm." to --1310 nm.--.

Column 8,
 line 39, after "wavelength of", change "1310 μm" to --1310 nm--.
 line 51, after "of", change "1310 μm," to --1310 nm,--.

Signed and Sealed this

Sixteenth Day of June, 2009

JOHN DOLL
*Acting Director of the United States Patent and Trademark Office*